United States Patent
Yokoyama

(10) Patent No.: US 10,228,707 B2
(45) Date of Patent: Mar. 12, 2019

(54) VALVE CONTROL DEVICE AND VALVE CONTROL METHOD

(71) Applicant: MIKUNI CORPORATION, Chiyoda-ku, Tokyo (JP)

(72) Inventor: Munekazu Yokoyama, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 91 days.

(21) Appl. No.: 14/765,641

(22) PCT Filed: Jan. 30, 2014

(86) PCT No.: PCT/JP2014/052079
§ 371 (c)(1),
(2) Date: Aug. 4, 2015

(87) PCT Pub. No.: WO2014/125929
PCT Pub. Date: Aug. 21, 2014

(65) Prior Publication Data
US 2015/0370261 A1 Dec. 24, 2015

(30) Foreign Application Priority Data

Feb. 18, 2013 (JP) .................................. 2013-028595

(51) Int. Cl.
*G05D 7/06* (2006.01)
*F02D 41/14* (2006.01)
(Continued)

(52) U.S. Cl.
CPC ....... *G05D 7/0635* (2013.01); *F02D 41/1401* (2013.01); *G05B 15/02* (2013.01); *F01P 2007/146* (2013.01); *F02D 2041/1409* (2013.01)

(58) Field of Classification Search
USPC ....................... 700/282; 172/2, 4.5
See application file for complete search history.

(56) References Cited

U.S. PATENT DOCUMENTS 5,170,860 A * 12/1992 Suzuki ................... B60K 28/16
123/399
6,546,920 B1 * 4/2003 Kawamura ............ F02M 26/48
123/568.23
(Continued)

FOREIGN PATENT DOCUMENTS

JP  2001-075651  3/2001
JP  2003120294   4/2003
(Continued)

OTHER PUBLICATIONS

Extended European Search Report for European Patent Application No. 14751093.7 dated Sep. 8, 2016, 6 Pages.
(Continued)

*Primary Examiner* — Emilio J Saavedra
(74) *Attorney, Agent, or Firm* — Amin, Turocy & Watson LLP

(57) ABSTRACT

A valve control device for controlling a drive device that drives a valve includes: an operation amount calculation unit that calculates an operation amount of the drive device at predetermined sampling intervals based on a control deviation between a target value of an opening degree of the valve and an actually measured value of an opening degree of the valve; a state determination unit that determines whether the valve is in a steady or transient state; and a first correction unit that outputs, if the state determination unit determines the valve is in the steady state, a predetermined first correction value corresponding to a sign of the control deviation to correct the operation amount calculated by the operation amount calculation unit with the first correction value.

8 Claims, 6 Drawing Sheets

(51) Int. Cl.
    *G05B 15/02*     (2006.01)
    *F01P 7/14*     (2006.01)

(56) References Cited

U.S. PATENT DOCUMENTS

| | | | |
|---|---|---|---|
| 9,243,590 B2 * | 1/2016 | Fukuda | ............... F02D 41/0077 |
| 2004/0041035 A1 | 3/2004 | Takei et al. | |
| 2005/0006487 A1 | 1/2005 | Suda et al. | |
| 2010/0180951 A1 | 7/2010 | Smirnov | |
| 2013/0268161 A1 * | 10/2013 | Izutani | ................... B62D 5/065 |
| | | | 701/42 |

FOREIGN PATENT DOCUMENTS

| | | |
|---|---|---|
| JP | 2004-137981 | 5/2004 |
| JP | 2008-202484 | 9/2008 |

OTHER PUBLICATIONS

Japanese Office Action for Japanese Patent Application No. 2013-028595 dated Feb. 14, 2017.
International Search Report for International Patent Application No. PCT/JP2014/052079 dated Mar. 11, 2014, 4 pages.
Written Opinion for International Patent Application No. PCT/JP2014/052079 dated Mar. 11, 2014, 4 pages.

\* cited by examiner

VALVE CONTROL DEVICE AND VALVE CONTROL METHOD

TECHNICAL FIELD

The present invention relates to a valve control device and valve control method that control an electronic control valve.

BACKGROUND ART

A technique for electronically controlling a valve using feedback control such as PID (Proportional Integral Derivative) control has been known. The valves to be controlled by the technique include an engine's throttle valve and a cooling water valve, for example. During control of such a throttle valve, hysteresis could occur due to frictional resistance between parts of a control mechanism. Therefore, the problem is that a measured value of the control target does not reach a required target value. To solve such a problem, what has been known is a valve control device that corrects hysteresis at a time when a control volume calculated by a position feedback control side of the throttle valve increases or decreases in order to quickly and accurately control a drive mechanism of the control target having hysteresis friction from a measured value toward a required target value (Refer to Patent Document 1, for example).

Incidentally, as relevant technology, what has been known is a technique for calculating an elapsed time required for the temperature of water to change after energization of an actuator which is calculated by a controller in a cooling water temperature control system of an automobile engine, predicting a temperature that the water would reach after the elapsed time, and controlling the actuator in advance based on the predicted water temperature (Refer to Patent Document 2, for example). In this manner, this technique realizes a high level of trackability for the temperature of cooling water (Refer to Patent Document 2, for example).

PRIOR ART DOCUMENTS

Patent Documents

[Patent Document 1] Japanese Laid-Open Patent Application No. 2008-202484
[Patent Document 2] Japanese Laid-Open Patent Application No. 2004-137981

SUMMARY OF THE INVENTION

Problems to be Solved by the Invention

However, while the above throttle valve is designed to adjust the amount of air taken into the engine, the cooling water valve is designed to adjust the flow rate of cooling water that cools the engine. Therefore, the problem is that factors that are different from those for the throttle valve are behind a worsening of setting performance of the valve to a target opening degree, or that the control performance for adjustment of the flow rate of cooling water becomes poor. The factors that are different from those for the throttle valve include, for example, instability of friction caused by occurrence of a stick-slip phenomenon between the cooling water valve and a seal member or caused by any other reason. Such a problem is not limited to the cooling water valve. The problem could arise in a wide range of control systems for valves that adjust the flow rate of fluid.

The present invention has been made to solve the above problems. The object of the present invention is to provide a valve control device and valve control method that can improve the performance of setting of a valve to a target opening degree during control of the valve that adjusts a flow rate of fluid.

Means for Solving the Problems

To solve the above problems, one aspect of the present invention includes: an operation amount calculation unit that calculates an operation amount of the drive device at predetermined sampling intervals based on a control deviation between a target value of an opening degree of the valve and an actually measured value of an opening degree of the valve; a state determination unit that determines whether the valve is in a steady or transient state; and a first correction unit that outputs, if the state determination unit determines that the valve is in the steady state, a predetermined first correction value corresponding to a sign of the control deviation to correct the operation amount calculated by the operation amount calculation unit with the first correction value.

Advantages of the Invention

According to the present invention, it is possible to improve the performance of setting of a valve to a target opening degree during control of the valve that adjusts a flow rate of fluid.

BEST MODE FOR CARRYING OUT THE INVENTION

Hereinafter, an embodiment of the present invention will be described with reference to the accompanying drawings.

Figure 1:
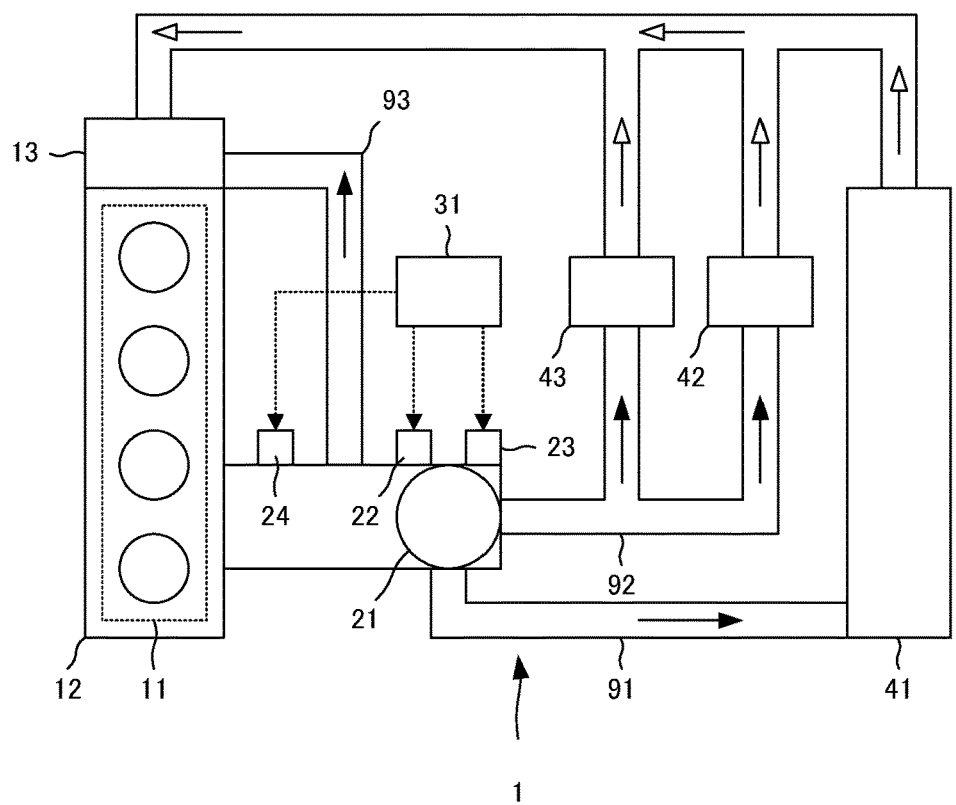
FIG. 1 is a schematic diagram showing an engine cooling system according to the present embodiment.

First, an engine cooling system of the present embodiment will be described. FIG. 1 is a schematic diagram showing an engine cooling system according to the present embodiment.

As shown in FIG. 1, an engine cooling system 1 of the present embodiment includes an engine 11, a water jacket 12, a water pump 13, a cooling water valve 21, a motor 22, a position sensor 23, a water temperature sensor 24, ECU (Engine Control Unit) 31, a radiator 41, a heater 42, a throttle 43, a main flow channel pipe 91, a sub flow channel pipe 92, a bypass flow channel pipe 93.

The engine cooling system 1 circulates cooling water via the main flow channel pipe 91, sub flow channel pipe 92, or bypass flow channel pipe 93. The engine cooling system 1 uses the water jacket 12 to control the temperature of the engine 11.

The engine 11 is an internal-combustion engine of a vehicle, such as an automobile. The water jacket 12 is provided near the engine 11 and is designed to cool the engine 11 with cooling water inside the water jacket 12. The main flow channel pipe 91 allows the cooling water to flow into the radiator 41. The sub flow channel pipe 92 allows the cooling water to flow into the heater 42 and the throttle 43. The bypass flow channel pipe 93 allows the cooling water flowing out of the water jacket 12 to flow into the water pump 13. Incidentally, after flowing into the radiator 41, heater 42, and throttle 43, the cooling water flows into the water pump 13. The water pump 13 forces the cooling water into the water jacket 12. The radiator 41 cools the cooling water. The heater 42 heats the interior of the vehicle. The throttle 43 is designed to control the amount of exhaled air flowing into the engine 11.

The cooling water valve 21 is a rotary valve. In a portion of an outer peripheral surface of the cooling water valve 21, an opening is provided. Depending on the degree of the opening, the cooling water flows into the main flow channel pipe 91 and the sub flow channel pipe 92. The motor 22 is a DC motor that serves an actuator to drive the cooling water valve 21. The position sensor 23 detects a circumferential-direction position of the cooling water valve 21 in order to detect the degree of opening of the cooling water valve 21 to the main flow channel pipe 91 and the sub flow channel pipe 92. The water temperature sensor 24 detects the temperature of the cooling water. ECU 31 is a micro controller that includes a processor and memory to control various operations pertaining to the engine 11. In the case of the present embodiment, suppose that ECU 31 controls operation of the motor 22 based on the position of the cooling water valve 21 detected by the position sensor 23 and the temperature of cooling water detected by the water temperature sensor 24.

According to the above-described configuration, the cooling water circulates via the main flow channel pipe 91; the cooling water is cooled by the radiator 41. When the cooling water passes through the bypass flow channel pipe 93, the cooling water circulates without being cooled. The engine cooling system 1 switches the circulation routes of the cooling water by changing the degree of opening of the cooling water valve 21. Moreover, the engine cooling system 1 controls the temperature of the engine 11 by controlling the amount of cooling water flowing into the main flow channel pipe 91.

Figure 2:
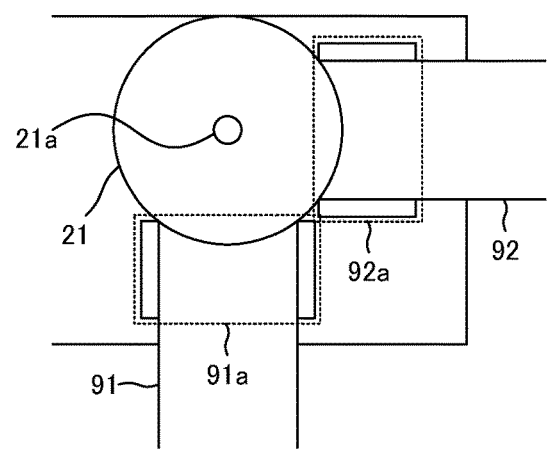
FIG. 2 is a schematic diagram showing a cooling water valve and a seal member.

The cooling water valve and a seal member will be described. FIG. 2 is a schematic diagram showing the cooling water valve and the seal member.

As shown in FIG. 2, near the cooling water inlets of the main flow channel pipe 91 and sub flow channel pipe 92, seal members 91a and 92a are provided in such a way as to cover the outer peripheries of the pipes. The cooling water valve 21 is designed to rotate around a rotation axis 21a in a circumferential direction, thereby changing the position of an opening for the main flow channel pipe 91 and sub flow channel pipe 92. Based on the position of the opening, the amount of cooling water flowing into the main flow channel pipe 91 and sub flow channel pipe 92 is adjusted. In the case of this configuration, between the cooling water valve 21 and the seal members 91a and 92b, hysteresis friction, stick-slip, or the like could occur. Moreover, depending on the position of the opening, an area where the cooling water valve 21 is in contact with the seal members 91a and 92b would vary, leading to a fluctuation in friction coefficient.

Figure 3:
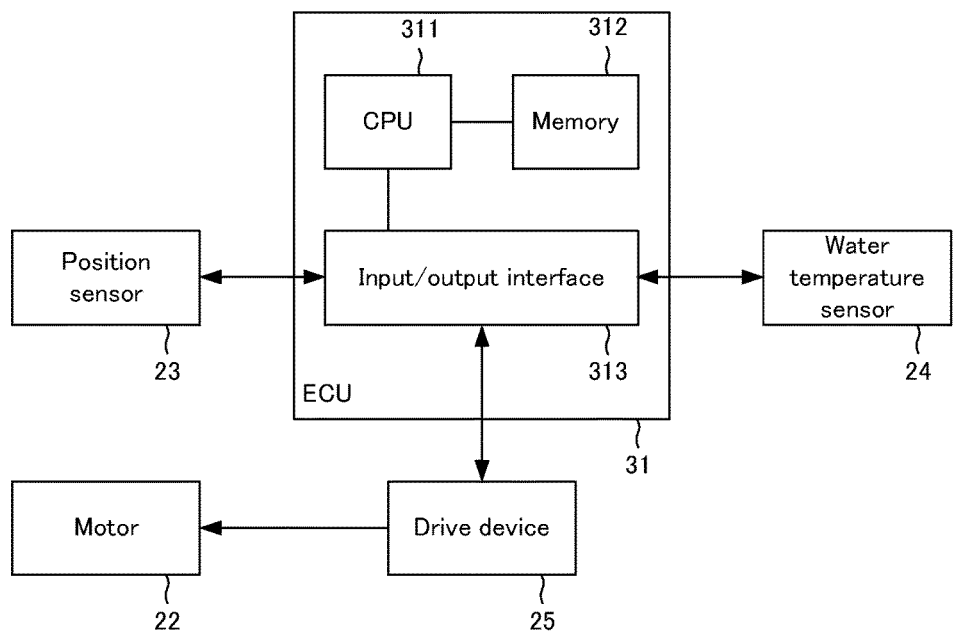
FIG. 3 is a block diagram showing the hardware configuration of ECU.

The hardware configuration of the ECU will be described. FIG. 3 is a block diagram showing the hardware configuration of the ECU.

As shown in FIG. 3, ECU 31 includes CPU (Central Processing Unit) 311, a memory 312, and an input/output interface 313. CPU 311 and the memory 312 work cooperatively in order to carry out processing relating to control of the cooling water valve 21. The input/output interface 313 is an interface for the inputting and outputting of CPU 311. CPU 311 obtains results of detection by the position sensor 23 and the water temperature sensor 24 via the input/output interface 313. CPU 311 also outputs, to a drive circuit 25, a signal corresponding to an amount of operation of the motor 22 via the input/output interface 313. The drive circuit 25 is a PWM circuit that controls the motor 22 in a PWM (Pulse Width Modulation) manner. The drive circuit 25 changes the duty ratio of a pulse width according to the magnitude of an input signal in order to drive the motor 22.

Figure 4:
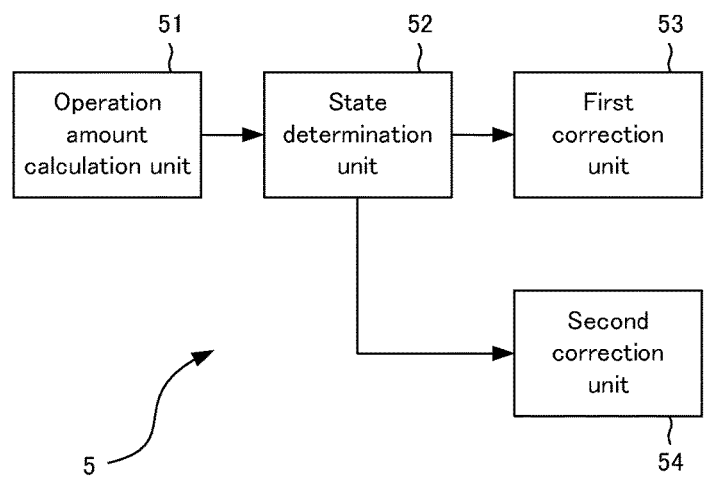
FIG. 4 is a functional block diagram showing the functional configuration of a valve control device.

The functional configuration of a valve control device will be described. Incidentally, in the case of the present embodiment, ECU 31 functions as a valve control device. FIG. 4 is a functional block diagram showing the functional configuration of the valve control device. Incidentally, in the description below, the control target is limited to the opening degree of the cooling water valve 21.

As shown in FIG. 4, a valve control device 5 includes, as its functions, an operation amount calculation unit 51, a state determination unit 52, a first correction unit 53, and a second correction unit 54. Incidentally, these functions are realized by the above-described CPU 311 and memory 312 that work cooperatively.

The operation amount calculation unit 51 calculates, based on a target temperature which the engine 11 is aimed at reaching and based on the temperature of cooling water detected by the water temperature sensor 24, a target flow rate which is a flow rate of cooling water for the water jacket 12 that is set as a target in order to bring the engine 11 to the target temperature. Based on the target flow rate, the operation amount calculation unit 51 calculates a value (target value) of target opening degree which is a target opening degree for the cooling water valve 21. The operation amount calculation unit 51 calculates, through the PID control that is based on the calculated target value and an actual opening degree (current value) of the cooling water valve 21 detected by the position sensor 23 as feedback, an amount of operation for the motor 22.

Incidentally, according to the present embodiment, a movable range of the cooling water valve 21 is set at 190 degrees, and the resolution associated with the driving of the motor 22 is set at 240. Accordingly, in the case of the present embodiment, the opening degree of the cooling water valve 21 is adjusted by 0.344 degrees each time. If the operation amount is increased in positive direction, the cooling water valve 21 is controlled in an open direction. The control of the cooling water valve 21 is performed at predetermined sampling intervals.

The state determination unit 52 carries out a determination process to determine whether the cooling water valve 21 is in a steady or transient state. The determination process will be described later. The first correction unit 53 carries out a steady state correction process, described later, when it is determined by the state determination unit 52 that the cooling water valve 21 is in the steady state. The second correction unit 54 carries out a transient state correction process, described later, when it is determined by the state determination unit 52 that the cooling water valve 21 is in the transient state. Incidentally, the steady state correction process and the transient state correction process calculate a hysteresis correction value; the hysteresis correction values are integrated and added to the operation amount calculated by the operation amount calculation unit 51.

Figure 5:
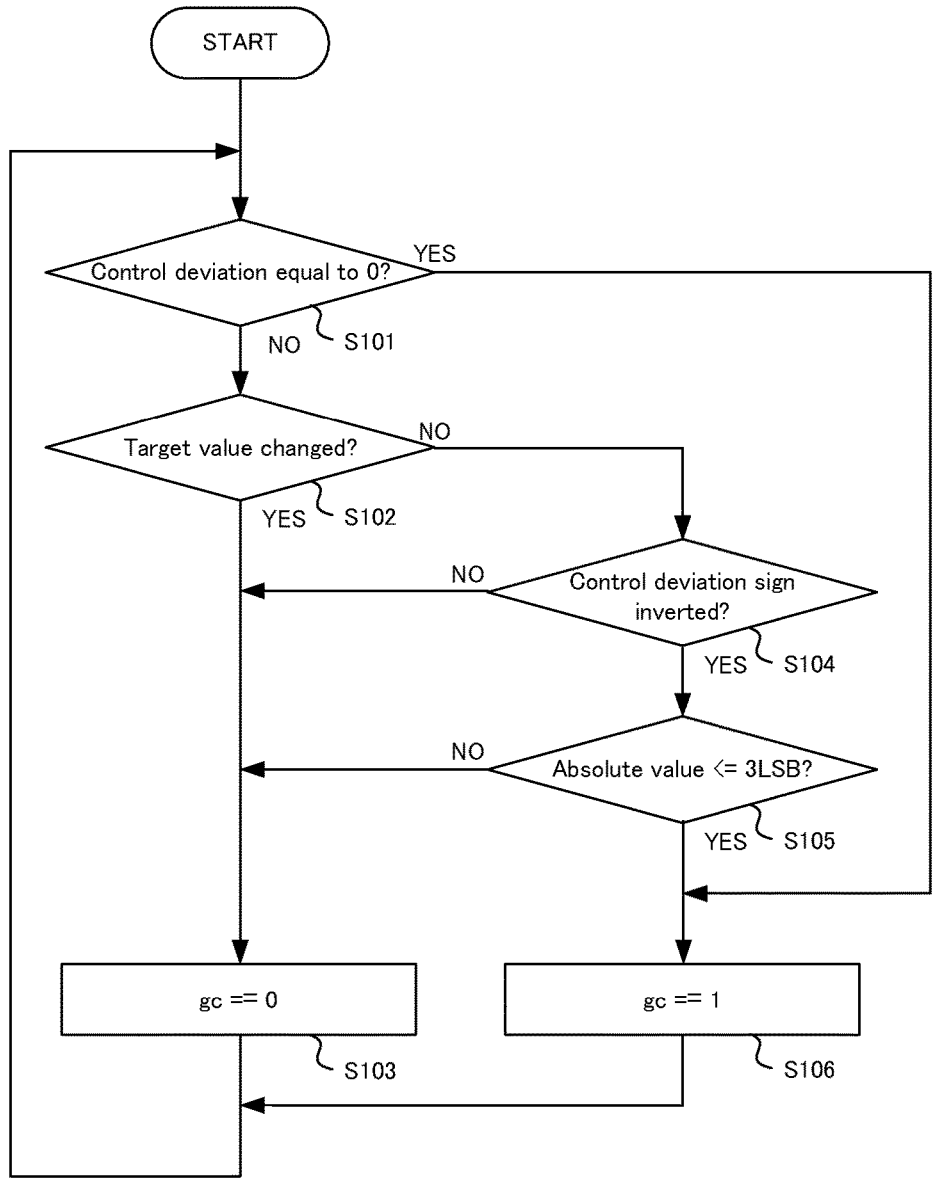
FIG. 5 is a flowchart showing operation of a determination process.

The determination process will be described. FIG. 5 is a flowchart showing operation of the determination process.

As shown in FIG. 5, the state determination unit 52 determines whether or not a control deviation is 0 (S101). In this case, the control deviation represents a control deviation that is based on the target value of the cooling water valve 21 and the current value of the cooling water valve 21.

If the control deviation is not 0 (S101, NO), the state determination unit 52 determines whether or not the target value calculated by the operation amount calculation unit 51 has been changed (S102).

If the target value has been changed (S102, YES), the state determination unit 52 sets a variable gc, which represents whether the cooling water valve 21 is in the steady or transient state, at 0, which means the valve is in the transient state (S103). The state determination unit 52 then determines again whether or not the control deviation is 0 (S101).

If the target value has not been changed (S102, NO), the state determination unit 52 determines whether or not the sign of the control deviation has been inverted (S104). In this case, the determination unit 52 determines whether or not the sign of the current control deviation has been inverted by comparing the sign with that of the control deviation of the previously sampled.

If the sign of the control deviation has been inverted (S104, YES), the state determination unit 52 determines whether or not the absolute value of the control deviation is less than or equal to 3LSB (S105).

If the absolute value of the control deviation is less than or equal to 3LSB (S105, YES), the state determination unit 52 sets the variable gc at 1 (S106), which means the valve is in the steady state, and then determines again whether or not the control deviation is 0 (S101).

If the absolute value of the control deviation is greater than 3LSB (S105, NO), the state determination unit 52 sets the variable gc at 0, which means that the valve is in the transient state (S103). The state determination unit 52 then determines again whether or not the control deviation is 0 (S101).

If the sign of the deviation has yet to be inverted at the time of the determination at step S104 (S104, NO), the state determination unit 52 sets the variable gc at 0, which means that the valve is in the transient state (S103). The state determination unit 52 then determines again whether or not the control deviation is 0 (S101).

If the control deviation is 0 at the time of the determination at step S101 (S101, YES), the state determination unit 52 sets the variable gc at 1, which means that the valve is in the steady state (S106). The state determination unit 52 then determines again whether or not the control deviation is 0 (S101).

As described above, the state determination unit 52 judges the cooling water valve 21 to be in the steady state when the control deviation is 0 and when the sign of the control deviation has been inverted with no change in the target value and with the control deviation's absolute value less than or equal to a predetermined value. Incidentally, during the above-described process, the state determination unit 52 waits for the next sample after setting the variable gc.

Figure 6:
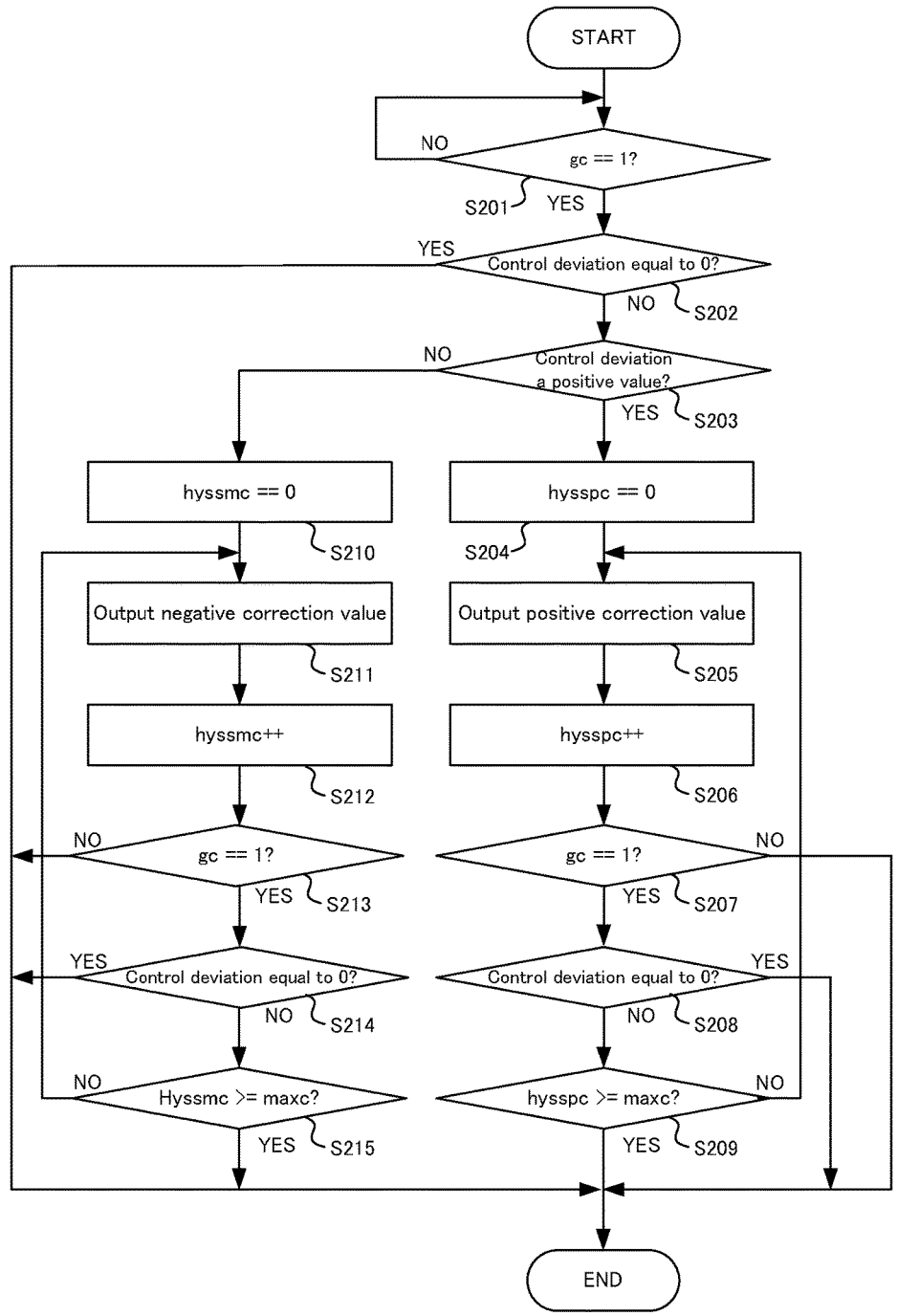
FIG. 6 is a flowchart showing operation of a steady state correction process.

The steady state correction process will be described. FIG. 6 is a flowchart showing operation of the steady state correction process.

As shown in FIG. 6, the first correction unit 53 determines whether or not the variable gc is 1 (S201).

If the variable gc is 1 (S201, YES), the first correction unit 53 determines whether or not the control deviation is 0 (S202).

If the control deviation is not 0 (S202, NO), the first correction unit 53 determines whether or not the control deviation is a positive value (S203).

If the control deviation is a positive value (S203, YES), the first correction unit 53 initializes a counter variable hysspc by setting the counter variable at 0 (S204). The first correction unit 53 then outputs a predetermined positive correction value as a hysteresis correction value (S205), increments the variable hysspc (S206), waits for the next sample, and determines whether or not the variable gc is 1 (S207).

If the variable gc is 1 (S207, YES), the first correction unit 53 determines whether or not the control deviation is 0 (S208).

If the control deviation is not 0 (S208, NO), the first correction unit 53 determines whether or not the variable hysspc is greater than or equal to maxc, which is a variable representing a predetermined threshold value (S209).

If the variable hysspc is greater than or equal to the variable maxc (S209, YES), the first correction unit 53 finishes the steady state correction process.

If the variable hysspc is less than the variable maxc (S209, NO), the first correction unit 53 again outputs a predetermined positive correction value as a hysteresis correction value (S205).

If the control deviation is 0 at the time of the determination at step S208 (S208, YES), the first correction unit 53 finishes the steady state correction process.

If the variable gc is not 1 at the time of the determination at step S207 (S207, NO), the first correction unit 53 finishes the steady state correction process.

If the control deviation is a negative value at the time of the determination at step S203 (S203, NO), the first correction unit 53 sets the variable hyssmc at 0 to initialize the variable (S210), outputs a predetermined negative correction value as a hysteresis correction value (S211), increments the variable hyssmc (S212), waits for the next sample, and determines whether or not the variable gc is 1 (S213).

If the variable gc is 1 (S213, YES), the first correction unit 53 determines whether or not the control deviation is 0 (S214).

If the control deviation is not 0 (S214, NO), the first correction unit 53 determines whether the variable hyssmc is greater than or equal to a variable maxc (S215).

If the variable hyssmc is greater than or equal to the variable maxc (S215, YES), the first correction unit 53 finishes the steady state correction process.

If the variable hyssmc is less than the variable maxc (S215, NO), the first correction unit 53 outputs a predetermined negative correction value as a hysteresis correction value (S211).

If the control deviation is 0 at the time of the determination at step S214 (S214, YES), the first correction unit 53 finishes the steady state correction process.

If the variable gc is not 1 at the time of the determination at step S213 (S213, NO), the first correction unit 53 finishes the steady state correction process.

If the variable gc is not 1 at the time of the determination at step S201 (S201, NO), the first correction unit 53 waits for the next sample before determining again whether or not the variable gc is 1 (S201).

As described above, if there is a control deviation in the steady state, the first correction unit 53 outputs a predetermined hysteresis correction value depending on the sign thereof. In outputting the hysteresis correction value, the first correction unit 53 continues outputting a predetermined hysteresis correction value unless the control deviation becomes 0 and unless the number of times the hysteresis correction value is outputted reaches a predetermined threshold value. That is, the first correction unit 53 outputs the hysteresis value multiple times. Such an operation helps improve the controllability of the cooling water valve 21 in the steady state.

Figure 7:
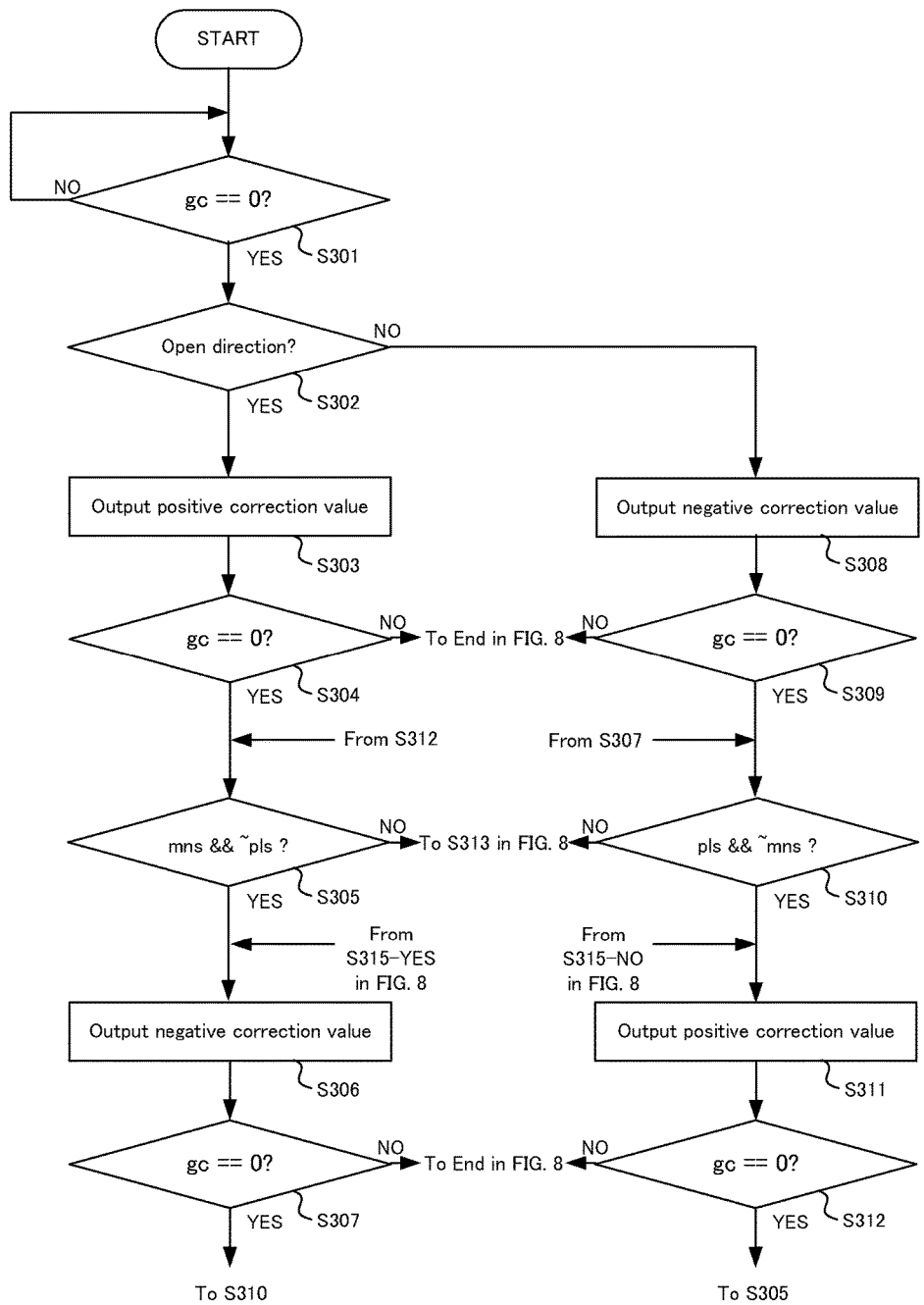
FIG. 7 is a flowchart showing operation of a transient state correction process.
Figure 8:
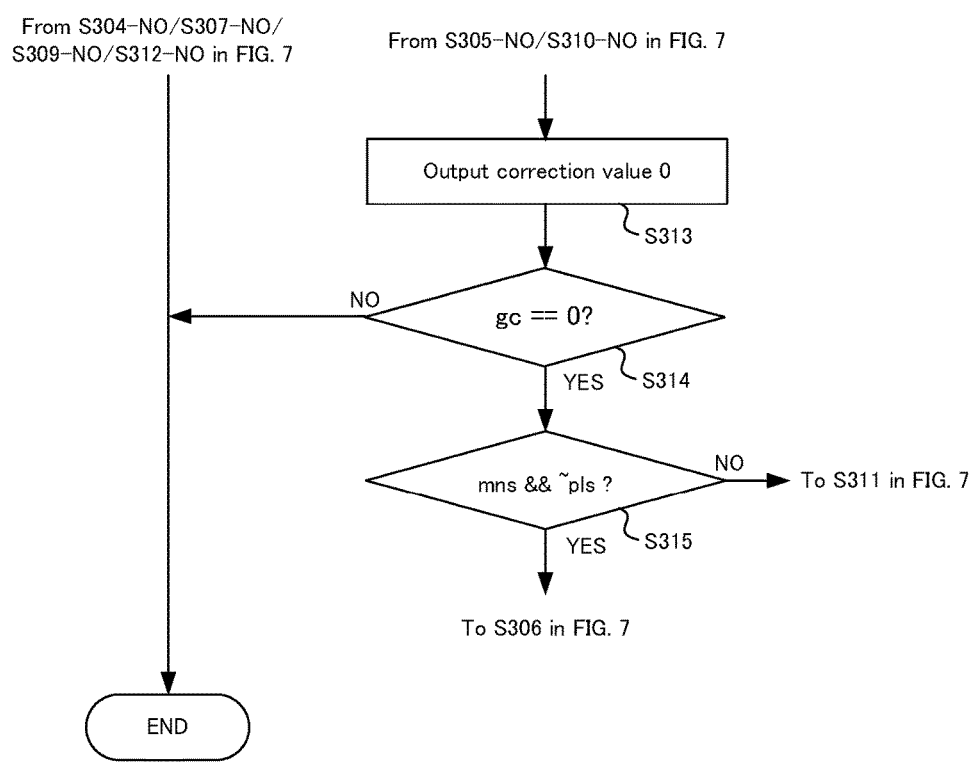
FIG. 8 is a flowchart showing operation of a transient state correction process.

The transient state correction process will be described. FIGS. 7 and 8 are flowcharts showing operation of the transient state correction process.

As shown in FIG. 7, first the second correction unit 54 determines whether or not the variable gc is 0 (S301).

If the variable gc is 0 (S301, YES), the second correction unit 54 determines whether or not an operation direction of the cooling water valve 21 is the open direction (S302).

If the operation direction of the cooling water valve 21 is the open direction (S302, YES), the second correction unit 54 outputs a predetermined positive correction value as a hysteresis correction value (S303), waits for the next sample, and determines whether or not the variable gc is 0 (S304).

If the variable gc is 0 (S304, YES), the second correction unit 54 determines whether or not a variable mns is 1 and whether or not a variable pls is 0 (S305).

The variables mns and pls will be described. The variable mns is 1 when the operation amount of the current sample has decreased compared with the operation amount of the previous sample and the operation amount of the previous sample has not decreased compared with the operation amount of the sample that came before the previous sample. The variable mns otherwise becomes 0. The variable pls is 1 when the operation amount of the current sample has increased compared with the operation amount of the previous sample and the operation amount of the previous sample has not increased compared with the operation amount of the sample that came before the previous sample. The variable pls otherwise becomes 0.

If the variable mns is 1 and the variable pls is 0 (S305, YES), the second correction unit 54 outputs a predetermined negative correction value as a hysteresis correction value (S306), waits for the next sample, and determines whether or not the variable gc is 0 (S307).

If the operation direction of the cooling water valve 21 is in a close direction at the time of the determination at step S302 (S302, NO), the second correction unit 54 outputs a predetermined negative correction value as a hysteresis correction value (S308), waits for the next sample, and determines whether or not the variable gc is 0 (S309).

If the variable gc is 0 (S309, YES), the second correction unit 54 determines whether or not the variable pls is 1 and whether or not the variable mns is 0 (S310).

If the variable pls is 1 and the variable mns is 0 (S310, YES), the second correction unit 54 outputs a predetermined positive correction value as a hysteresis correction value (S311), waits for the next sample, and determines whether or not the variable gc is 0 (S312).

If the variable gc is 0 (S312, YES), the second correction unit 54 determines whether or not the variable mns is 1 and whether or not the variable pls is 0 (S305).

If the variable gc is not 0 (S312, NO), the second correction unit 54 ends the transient state correction process as shown in FIG. 8.

If the variable gc is 0 at the time of the determination at step S307 (S307, YES), the second correction unit 54 determines whether or not the variable pls is 1 and whether or not the variable mns is 0 (S310).

If the variable gc is not 0 at the time of the determination at steps S307 and S312 (S307, NO/S312, NO), the second correction unit 54 ends the transient state correction process in both cases as shown in FIG. 8.

If the variable mns is not 1 or the variable pls is not 0 at the time of the determination at step S305 (S305, NO), and if the variable pls is not 1 or the variable mns is not 0 at the time of the determination at step S310 (S310, NO), the second correction unit 54 carries out the process of step S313, as described later, in both cases as shown in FIG. 8.

If the variable gc is not 0 at the time of the determination at step S301 (S301, NO), the second correction unit 54 waits for the next sample before determining again whether or not the variable gc is 0 (S301).

The processes that follow that of step S313 will be described. As shown in FIG. 8, the second correction unit 54 outputs a correction value of 0 (S313), waits for the next sample, and determines whether or not the variable gc is 0 (S314).

If the variable gc is 0 (S314, YES), the second correction unit 54 determines whether or not the variable mns is 1 and whether or not the variable pls is 0 (S315).

If the variable mns is 1 and the variable pls is 0 (S315, YES), the second correction unit 54 outputs, as shown in FIG. 7, a predetermined negative correction value as a hysteresis correction value (S306).

If the variable mns is not 1 or the variable pls is not 0 (S315, NO), the second correction unit 54 outputs, as shown in FIG. 7, a predetermined positive correction value as a hysteresis correction value (S311).

If the variable gc is not 0 at the time of the determination at step S314 (S314, NO), the second correction unit 54 ends the transient state correction process.

As described above, when the operation amount starts to decrease in the transient state, the second correction unit 54 outputs a negative correction value. When the operation amount starts to increase, the second correction unit 54 outputs a positive correction value. Such an operation helps improve the controllability of the cooling water valve 21 in the transient state.

As described above, the valve control device 5 of the present embodiment outputs a hysteresis correction value based on the steady state and the transient state. Particularly in the steady state, it is possible to improve the performance of setting the cooling water valve 21 to a target opening degree. As a result, it is possible to improve the controllability of the flow rate of cooling water, and therefore to improve the controllability of the temperature of the engine 11. Incidentally, according to the present embodiment, what is controlled by the valve control device 5 is the cooling water valve 21. The valve control device 5 may also be applied to a valve that controls the flow rate of fluid.

The present invention can be embodied in other various forms without departing from the spirit or main features thereof. Thus, the above-described embodiment is merely illustrative in all aspects and should not be interpreted restrictively. The scope of the invention is defined by the appended claims and is not restricted by the specification at all. Furthermore, all modifications, various improvements, substitutions and alternations belonging to the equivalent scope of the claims are within the scope of the present invention.

EXPLANATION OF REFERENCE SYMBOLS

1: Engine cooling system
5: Valve control device
11: Engine
12: Water jacket
13: Water pump
21: Cooling water valve
22: Motor
23: Position sensor
24: Water temperature sensor
31: ECU
41: Radiator
42: Heater
43: Throttle
51: Operation amount calculation unit
52: State determination unit
53: First correction unit
54: Second correction unit
91: Main flow channel pipe
91a: Seal member
92: Sub flow channel pipe
92a: Seal member
93: Bypass flow channel pipe
311: CPU
312: Memory
313: Input/output interface

The invention claimed is:

1. A valve control device for controlling a motor that drives a valve, comprising:
    an operation amount calculation unit that calculates an operation amount to determine electrical current applied to the motor at predetermined sampling intervals based on a control deviation between a target value of an opening degree of the valve and an actually measured value of an opening degree of the valve;
    a determination unit that determines whether an absolute value of the control deviation is less than or equal to a predetermined deviation threshold; and
    a first correction unit that outputs, if the determination unit determines that the absolute value of the control deviation is less than or equal to the predetermined deviation threshold, a predetermined first correction value to correct the operation amount calculated by the operation amount calculation unit with the first correction value, wherein in response to a sign of the control deviation being positive, the first correction unit outputs a positive correction value as a first correction value, and in response to the sign of the control deviation being negative, the first correction unit outputs a negative correction value as the first correction value
    a controller which controls the motor that drives the valve based on the first correction value.

2. The valve control device according to claim 1, wherein, if a number of times the first correction value is output is less than a predetermined first threshold value, the first correction unit continues outputting the first correction value until the control deviation becomes zero.

3. The valve control device according to claim 1, wherein, the determination unit determines whether the sign of the control deviation is inverted with respect to the sign of the control deviation of a previous sample with no change in the target value and whether the absolute value of the control deviation is less than or equal to the absolute value of the control deviation is less than or equal to the deviation threshold and wherein, if the determination unit determines that the sign of the control deviation is inverted with respect to the sign of the control deviation of a previous sample with no change in the target value and the absolute value of the control deviation is less than or equal to the deviation threshold, the first correction unit outputs the first correction value to correct the operation amount.

4. The valve control device according to claim 1, further comprising:
    a second correction unit that outputs, if the determination unit determines that the absolute value of the control deviation is more than the deviation threshold, a predetermined second correction value corresponding to a change in the operation amount to correct the operation amount calculated by the operation amount calculation unit with the second correction value.

5. A valve control method of controlling a motor that drives a valve, the method causing a computer to execute:
    calculating an operation amount to determine electrical current applied to the motor at predetermined sampling intervals based on a control deviation between a target value of an opening degree of the valve and an actually measured value of an opening degree of the valve;
    determining whether an absolute value of the control deviation is less than or equal to a predetermined deviation threshold;
    outputting, if the absolute value of the control deviation is less than or equal to the predetermined deviation threshold, a predetermined first correction value to correct the calculated operation amount with the first correction value, wherein in response to a sign of the control deviation being positive, the outputting a positive correction value as a first correction value, and in response to the sign of the control deviation being negative, the outputting a negative correction value as the first correction value; and
    controlling the motor that drives the valve based on the first correction value.

6. The valve control method according to claim 5, wherein, if a number of times the first correction value is output is less than a predetermined first threshold value, the outputting of the first correction value is continued until the control deviation becomes zero.

7. The valve control method according to claim 5, wherein, if the sign of the control deviation is inverted with respect to the sign of the control deviation of a previous sample with no change in the target value and whether the absolute value of the control deviation is less than or equal to the absolute value of the control deviation is less than or equal to the deviation threshold and wherein, if the determining determines that the sign of the control deviation is inverted with respect to the sign of the control deviation of a previous sample with no change in the target value and the absolute value of the control deviation is less than or equal to the deviation threshold, outputting the first correction value to correct the operation amount.

8. The valve control method according to claim 5, the method causing a computer to further execute:

outputting, if the absolute value of the control deviation is more than the deviation threshold, a predetermined second correction value corresponding to a change in the operation amount to correct the calculated operation amount with the second correction value.

* * * * *